US00RE42557E

(19) United States
(12) Reissued Patent
Hwang et al.

(10) Patent Number: US RE42,557 E
(45) Date of Reissued Patent: Jul. 19, 2011

(54) BASE STATION TRANSCEIVER IN CDMA MOBILE COMMUNICATION SYSTEM

(75) Inventors: Woon Hee Hwang, Seoul (KR); Jae Hong Park, Seoul (KR); Hyun Soo Paik, Suwon (KR)

(73) Assignee: Transpacific Bluetooth, LLC, Wilmington, DE (US)

(21) Appl. No.: 12/618,262

(22) Filed: Nov. 13, 2009

Related U.S. Patent Documents

Reissue of:
(64) Patent No.: 6,795,416
Issued: Sep. 21, 2004
Appl. No.: 09/639,569
Filed: Aug. 16, 2000

(51) Int. Cl.
*H04J 13/00* (2006.01)

(52) U.S. Cl. ..... 370/335; 370/342; 370/441; 370/320; 375/262; 704/242; 714/795

(58) Field of Classification Search ..... 370/335, 370/342, 320, 441
See application file for complete search history.

(56) References Cited

U.S. PATENT DOCUMENTS 5,384,809 A * 1/1995 Yagi et al.
5,390,215 A 2/1995 Antia et al.
5,606,569 A 2/1997 MacDonald et al.
5,787,121 A * 7/1998 Okamoto ..... 375/262
6,005,898 A 12/1999 Kaewell, Jr.
6,310,907 B1 * 10/2001 Tsujimoto ..... 375/141
6,400,731 B1 * 6/2002 Nitta ..... 370/468
6,442,176 B1 * 8/2002 Yahagi ..... 370/474
6,690,652 B1 * 2/2004 Sadri ..... 370/252
6,714,596 B1 * 3/2004 Shiraishi et al. ..... 375/265
6,769,090 B1 * 7/2004 Halder ..... 714/792

* cited by examiner

*Primary Examiner* — Huy Phan
(74) *Attorney, Agent, or Firm* — McDonnell Boehnen Hulbert & Berghoff LLP

(57) ABSTRACT

The base station transceiver in a CDMA mobile communication system is configured to have a separate hardware component for performing only a Viterbi decoding apart from a single hardware H/W that performs a composite function of modulation/demodulation and Viterbi encoding/decoding. The modulator and the Viterbi encoder are provided in one hardware by sectors; more than one demodulator being provided by sectors for demodulating signals from multiple users. And, more than one Viterbi decoder is separately provided for performing a Viterbi decoding of the signals demodulated at the plural demodulator constituted in each sector, thereby facilitating a decoding of demodulated signals received from multiple users and enhancing efficiency of the hardware.

8 Claims, 3 Drawing Sheets

BASE STATION TRANSCEIVER IN CDMA MOBILE COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a base station transceiver in a CDMA (Code Division Multiple Access) mobile communication system and, more particularly, to a base station transceiver in a CDMA mobile communication system configured to have a separate hardware component for performing only a Viterbi decoding apart from a single hardware H/W that performs a composite function of modulation/demodulation and Viterbi encoding/decoding, thereby facilitating a decoding of demodulated signals received from multiple users.

2. Description of the Related Art

A base station transceiver (hereinafter, referred to as "BTS") in a CDMA digital mobile communication system communicates data and voice signals with mobile stations in a wireless way, controls mobile stations (e.g., PCS phones, DCS phones) to monitor speech quality, and connects a base station controller to the mobile stations linked to each other with wires. That is, the BTS located between the mobile stations and the base station controller matches radio channels and performs important functions related to the radio channels. Here, the important functions concerning the radio channels may include allocation and control of forward power for CDMA frequencies, channels and frame option sources, processing of originating and terminating calls, processing of soft and hard handoff call signals, reception and control of GPS time information and application of system time information into the mobile stations and base station.

Also, the BTS involves communication of radio signals over pilot channels, sync channels, access channels, paging channels and traffic channels, application of routing from the base station controller for traffic and control information, detection of errors in the BTS, and collection and report of statistic information.

Now, a description will be made as to the BTS in the conventional digital mobile communication system performing the afore-mentioned functions with reference to the accompanying drawings.

FIG. 1 is a block diagram illustrating the BTS in the mobile communication system according to the prior art.

Referring to FIG. 1, the BTS 20 includes a BTS control processor 21 for entirely operating and controlling the BTS 20; a BTS network matching section (BTS interconnection network) 22 for performing a packet router between the BTS 20 and the base station controller 10 via a line E1 or T1 and interfacing HDLC (High-Level Data Link Control) packet data between the processors in the BTS 20; a time and frequency unit 23 for generating a reference frequency and a timing sync signals to acquire synchronization of the respective processors in the BTS 20 and timing synchronization with neighboring BTS's; a digital signal processor 24 for modulating/demodulating data and voice signals communicated via CDMA channels; and an RF (Radio Frequency) signal processor 25 for converting an RF signal received from the mobile stations to an IF (Intermediate Frequency) signal, transmitting the IF signal to the digital signal processor 24, converting the IF signal received from the digital signal processor 24 to the RF signal and amplifying the RF signal to a predetermined level for spatial distribution.

First, in the conventional CDMA BTS as constructed above, the BTS network matching section 22 provides interface with the base station controller 10 and an internal communication channel of the base station controller 10 by way of a packet router.

The base station controller 21 entirely controls the BTS 20 to perform an adequate operation and downloads related software during an initial operation of the BTS 20.

The digital signal processor 24, which is a unit for processing data and voice signals received from or transmitted to the individual mobile stations, i.e., performing modulation, demodulation, Viterbi encoding and Viterbi decoding, processes all signals related to the CDMA system. Thus the digital signal processor 24 performs quite different operations from that of the BTS's in other communication systems, e.g., AMPS or TDMA (Time Division Multiple Access) BTS's.

The RF signal processor 25 converts the data and voice signals modulated at the digital signal processor 24 to an RF frequency, which is then transmitted to the mobile stations. The RF signal processor 25 also demodulates the data and voice signals received from the mobile stations into digital signals to be transmitted to the digital signal processor 24.

The time and frequency unit 23 receives a reference time necessary to the BTS 20 by way of GPS and applies the reference time to the BTS 20, so that all units in the BTS 20 acquire synchronization with GPS time and share the same timing.

To sum up, the above-described base station in the CDMA mobile communication system according to prior art includes an RF processor, an IF processor, a modem, a Viterbi encoder/decoder and a control processor.

The modem and the Viterbi encoder/decoder are provided in a single hardware circuit pack, and one channel element, i.e., one modulator, demodulator or Viterbi decoder accommodates only one user. Thus there is a need of a plurality of channel elements in order to accommodate multiple users. That is, the conventional base station transceiver involves some problems in that there must be provided a plurality of hardware circuit packs including the Viterbi decoders and that, when required, the users and sectors, i.e., $\alpha$, $\beta$ and $\gamma$ sectors must be increased in the units of channel element.

In addition, the Viterbi decoder has a capacity of no more than 144 Kbps even though there is a need of providing data and video services up to 144 Kbps with the advent of IMT-2000 (International Mobile Tele-communication) system, that is, the second-generation integrated radio communication service in the land and satellite environments supporting multimedia services of voice, high-speed data and image and global roaming. It is thus required to use a turbo decoder having a high decoding efficiency in order to provide high-speed services of greater than 144 Kbps. That is, there is required to substitute the Viterbi decoder with a turbo decoder in order to support a data service of higher than 144 Kbps with a modulator, demodulator and a Viterbi decoder in one hardware circuit pack, which incurs a serious problem involving an entire modification of the hardware circuit pack. Also, signals from multiple users are combined in the analog form and thus accurate synchronization is hard to acquire in the case of modulating the composite analog signals at a high chip rate such as in the IMT-2000 system. Furthermore, it is difficult to utilize the hardware efficiently because both the forward and reverse channels are allocated irrespective of the characteristics of the traffic channel.

SUMMARY OF THE INVENTION

It is, therefore, an object of the present invention to provide a base station transceiver in a CDMA mobile communication system configured to have a separate hardware component for performing only a Viterbi decoding apart from a single hardware H/W that performs a composite function of modulation/demodulation and Viterbi encoding/decoding, thereby facilitating a decoding of demodulated signals received from multiple users.

It is another object of the present invention to provide a base station transceiver in a CDMA mobile communication system configured to have a separate decoder hardware for performing only a Viterbi decoding apart from a single hardware H/W that performs both modulation/demodulation and Viterbi encoding/decoding functions, wherein a multi-user modulator board assembly combines channels from multiple users into digital signals to acquire accurate synchronization even at a high chip rate and Viterbi decoders are controlled in the form of a decoder pool, thus enhancing use efficiency of the decoder depending on the performance of the decoder element.

To achieve the above objects of the present invention, there is provided a base station system in a CDMA (Code Division Multiple Access) mobile communication system, which has a modulator, a demodulator and a Viterbi encoder/decoder in one hardware circuit pack, the modulator and the Viterbi encoder being provided in one hardware by sectors; more than one demodulator being provided by sectors for demodulating signals from multiple users; and more than one Viterbi decoder being separately provided for performing a Viterbi decoding of the signals demodulated at the plural demodulator constituted in each sector. Here, the Viterbi decoders are provided in the form of a Viterbi decoder pool.

In another aspect of the present invention, there is provided a base station system in a CDMA mobile communication system, which has a base station, a base station controller and a control station, the base station system including: a dedicated packet router section for routing a voice-encoded signal received from the control station to the base station and data decoded from the base station to the control station; a modulating section for calculating cyclic redundancy codes of I (In-phase)/Q (Quadrature) channel data received from the dedicated packet router section and convolution-encoding and interleaving the I/Q channel data using the calculated cyclic redundancy codes; a first intermediate frequency processing section for converting the convolution-encoded and interleaved I/Q channel data from the modulating section to analog signals, up-converting the analog signals to intermediate frequency signals having a frequency, and transmitting the intermediate frequency signals to a radio frequency signal processing unit; a second intermediate frequency processing section for downconverting the intermediate frequency signals having a frequency received from the radio frequency signal processing unit to I/Q channel base-band signals, and converting the I/Q channel base-band signals to digital signals; a demodulating section for despreading and interleaving the I/Q channel data from the second intermediate frequency processing section, and transmitting the despread and interleaved I/Q channel data to the modulating section; and a decoding section for Viterbi-decoding the demodulated data from the demodulating section.

DETAILED DESCRIPTION OF THE PREFERRED EMBODIMENT

Hereinafter, a preferred embodiment of the base station transceiver (BTS) in a CDMA mobile communication system according to the present invention will be described in detail with reference to the accompanying drawings.

First, the present invention comprises one channel element, i.e., modulator and Viterbi encoder provided in a single hardware to support multiple users; a plurality of demodulators implemented in a plurality of hardwares; and a plurality of Viterbi decoders in a Viterbi decoder pool provided in a separate hardware component, each for performing only a Viterbi decoding of demodulated signals from the individual demodulators.

Now, a detailed description will be made as to the BTS in a CDMA mobile communication system performing the afore-mentioned functions with reference to FIGS. 2 and 3.

Figure 1:
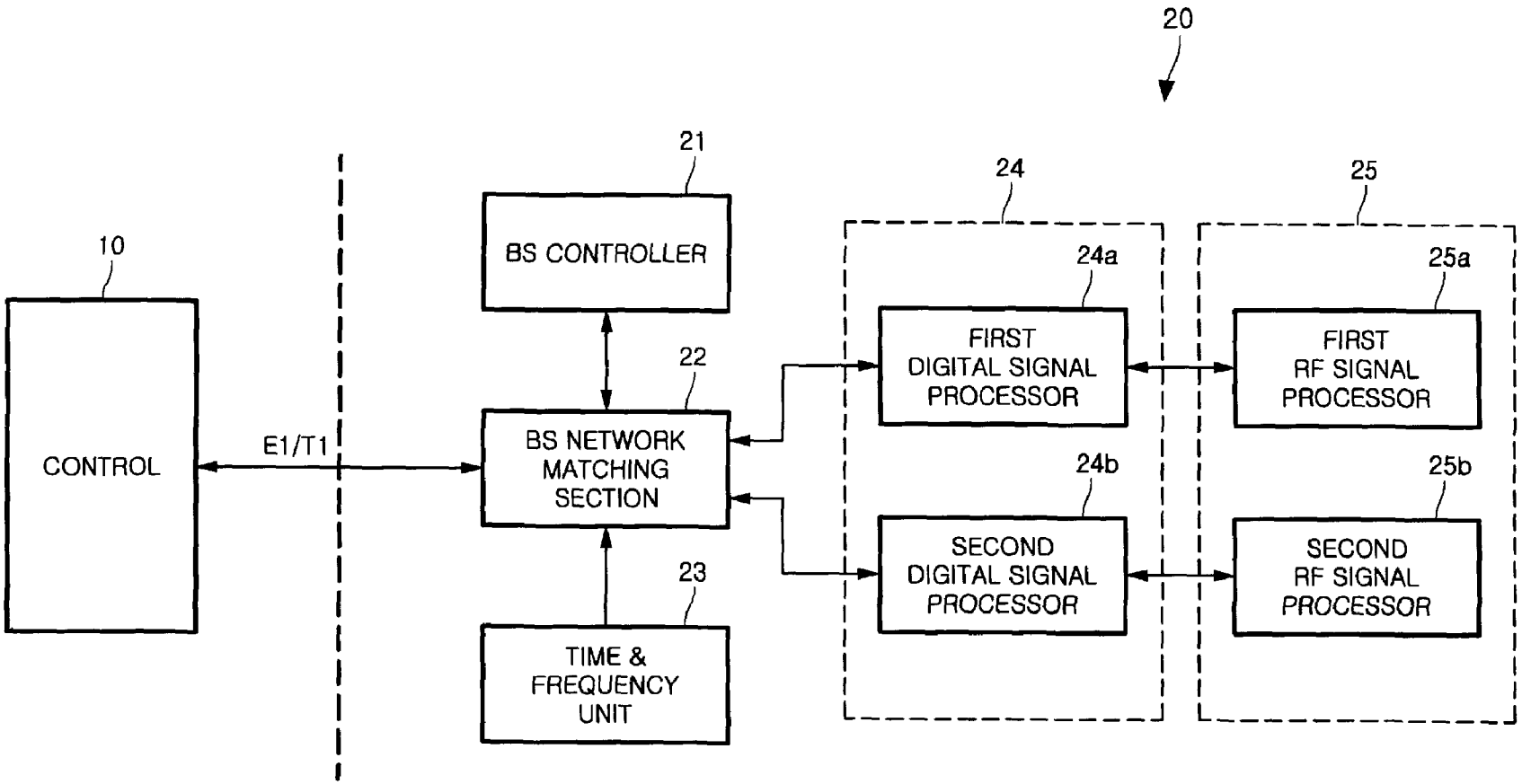
FIG. 1 is a block diagram of a base station transceiver in a CDMA mobile communication system according to prior art.
Figure 2:
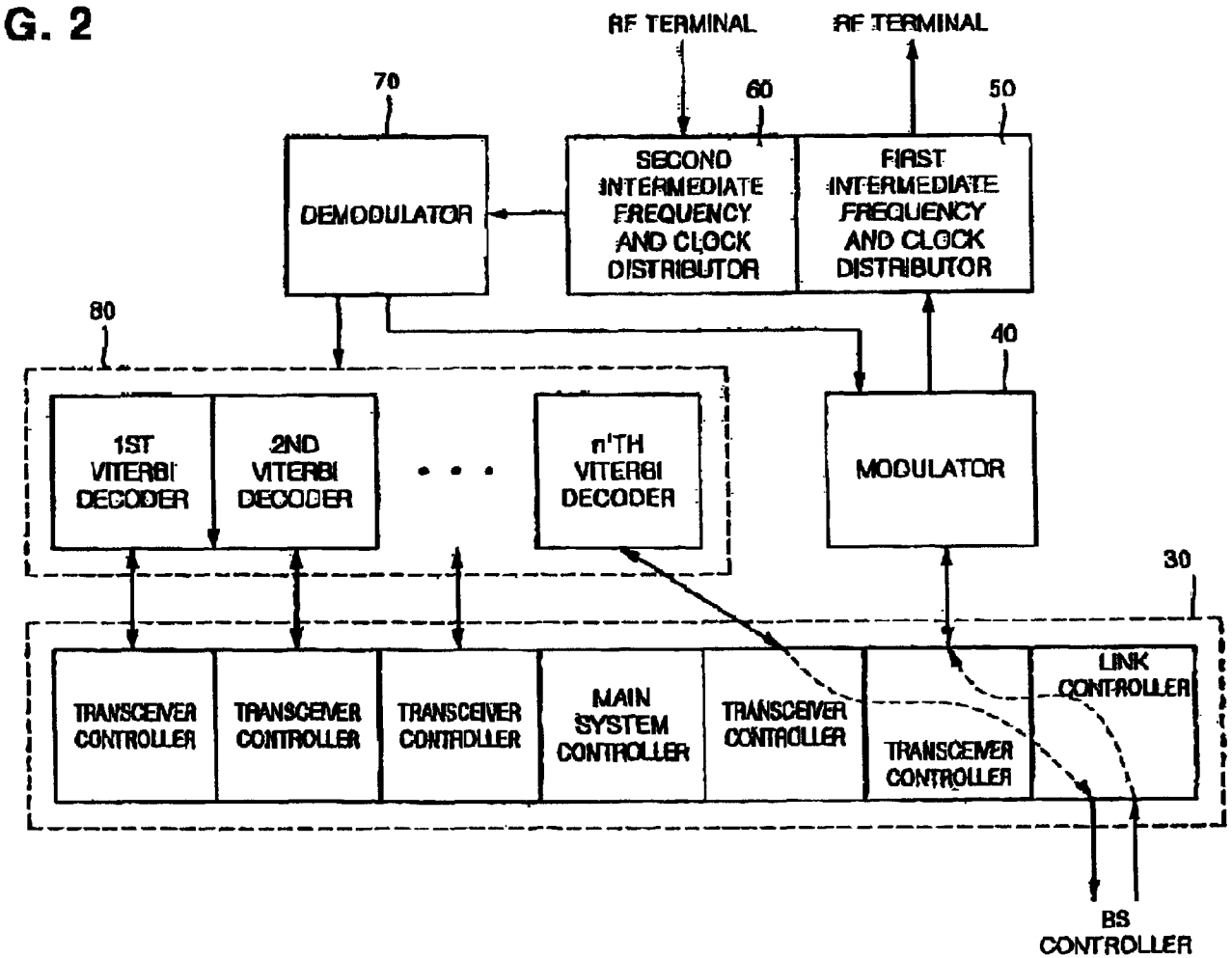
FIG. 2 is a block diagram of a base station transceiver in a CDMA mobile communicating system according to the present invention.

FIG. 2 is a block diagram illustrating the BTS in the CDMA mobile communication system according to the present invention, which comprises a modulator, a demodulator and a Viterbi decoder separated from one another in construction.

As shown in the figure, the BTS comprises: a dedicated packet router assembly 30 for routing a voice-coded signal received from a base station controller to a base station and also routing decoded data received from the base station to the base station controller; a multi-user modulator board assembly (hereinafter, referred to as "MUMA") 40 for calculating the CRC (Cyclic Redundancy Codes) of the data received from the dedicated packet router section 30 and then convolution-encoding and interleaving the data using the calculated CRC; and a first intermediate frequency and clock distributor (hereinafter, referred to as "ICDA") 50 for converting the I (In-phase)/Q (Quadrature) channel data modulated at the modulator to an analog signal, up-converting the analog signal to an IF (Intermediate Frequency) signal having an intermediate frequency, and transmitting the IF signal to an RF terminal (not shown).

The BTS further comprises: a second ICDA 60 for downconverting the IF signal received from the RF terminal to a base-band signal of I/Q channels and converting the base-band signal of I/Q channels to a digital signal; a multi-mode demodulator board assembly (hereinafter, referred to as "MMDA") 70 for despreading and deinterleaving the output signal from the second ICDA 60 and transmitting the despread and deinterleaved signal to the MUMA 40; and a decoding section 80 made up of a plurality of Viterbi decoders for Viterbi-decoding the signal received from the MMDA 70. Here, the MMDA 70 is made up of a plurality of demodulators for demodulating signals from multiple users.

Figure 3:
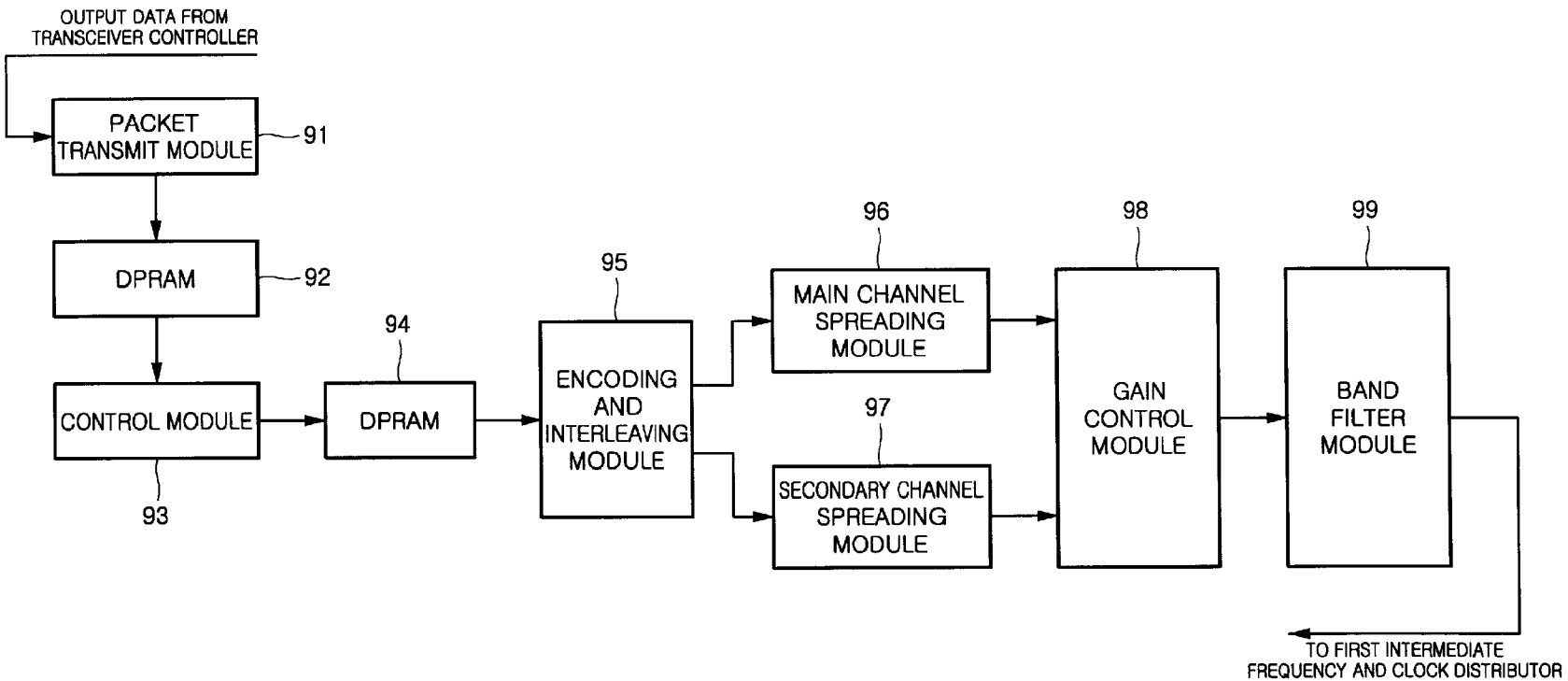
FIG. 3 is a block diagram showing an embodiment of the modulating section shown in FIG. 2.

The MUMA 40 comprises, as shown in FIG. 3, a packet transceiver module (hereinafter, referred to as "PTM") 91 for receiving traffic or signal data from the base station controller; a dual port RAM (hereinafter, referred to as "DPRAM") 92 for temporarily storing the data of the PTM 91; a control module 93 for reading the data stored in the DPRAM 92 and storing the read data in another DPRAM 94 in order to modulate the data; an encoding and interleaving module 95 for encoding and interleaving the data output from the DPRAM 94 under the control of the control module 93; main and sub channel spreading modules 96 and 97 for spreading the encoded and interleaved data; a gain control module 98 for gain-controlling the individual channel data from the main and sub channel spreading modules 96 and 97 and combining the gain-controlled channel data; and a band-pass filter module 99 for band-pass filtering the gain-controlled channel data from the gain control module 98 and transmitting the filtered channel data to the first ICDA 50.

Next, the operation of the above-constructed BTS in the CDMA mobile communication system according to the present invention will be described separately in terms of forward and backward link transmissions.

First, in the forward link transmission, a link controller of the dedicated packet router section 30 receives the voice-coded signal from the base station controller (BSC). The link controller transmits the voice-coded signal to a transceiver controller physically connected to the MUMA 40 in order to transmit the voice-coded signal to the modulator (multi-user modulation board assembly) 40. The transceiver controller transmits the data received from the link controller to the MUMA 40 via a cable.

The MUMA 40 receives the data at the DPRAM 92 via the internal PTM 91.

Besides, the control module 93 of the MUMA 40 controls the MUMA 40 to transfer the data stored in the DPRAM 92 via the PTM 91 to another DPRAM 94 for modulation of the data and output the data stored in the DPRAM 94 to the encoding and interleaving module 95.

The encoding and interleaving module 95 calculates the CRC of the input data and convolution-encodes and interleaves the data using the calculated CRC. Here, the CRC indicates a code used in the modified cyclic code for error detection and correction during transmission of the data.

Thereafter, the main and sub channel spreading modules 96 and 97 multiply the convolution-encoded and interleaved data by an orthogonal code and a pseudo noise code to modulate the data into a band-spread signal and transmit the band-spread signal to the gain control module 98.

The gain control module 98 controls the user-based gain of the band-spread signal received from the main and sub channel spreading modules 96 and 97 and inserts reverse channel transmission power control bits. The resulting data are base-band filtered at the band-pass filter module 99 and transmitted to the first ICDA for the purpose of up-conversion to the intermediate frequency band.

The first ICDA 50 converts the received digital signal to an analog signal. Here, the digital signal is received from the MUMA 40 in two forms of I-channel and Q-channel signal components.

The analog base-band signals converted from the I-channel and Q-channel digital signals are low-pass filtered at an internal low-pass filter (not shown) and then converted to an intermediate frequency band.

The first ICDA 50 multiplies the I-channel component of the base-band signal by a first intermediate frequency generated from an internal local oscillator (not shown), while multiplying the Q-channel component by a second intermediate frequency which is different in phase from the first intermediate frequency by 90 degrees.

The I-channel signal multiplied by the first intermediate frequency is mixed with the Q-channel signal multiplied by the second intermediate frequency differentiated in phase from the first intermediate frequency and the mixed signals are transferred to an automatic gain controller (not shown) via a band-pass filter (not shown) using an intermediate frequency of 21.4 MHz.

After passing through the automatic gain controller, the mixed signals are transferred to a frequency mixer (not shown) using a frequency of 48.6 MHz generated from an internal PLL circuit of the first ICDA 50 for up-conversion to the intermediate frequency band of 70 MHz. Then, the signals pass through the band-pass filter to remove an image signal generated at the frequency mixer. Thus image-removed signals are transmitted to the RF terminal via a coaxial cable.

While on the other, in the reverse link transmission, the RF signals received from two receiving antennas are each converted to IF signals of 70 MHz and the IF signals are fed into the second IDCA 60 via the coaxial cable.

The second IDCA 60 passes the two received IF signals through the band-pass filter (not shown) using an intermediate frequency of 70 MHz and down-converts the IF signals of the intermediate frequency using a frequency of 48.6 MHz generated from the internal PLL circuit. Here, the second IDCA 60 uses a variable gain controller (not shown) to gain-control the two received IF signals from the antennas to have a constant reception power.

Thus gain-controlled IF signals are converted to I-channel and Q-channel base-band signals via a demodulator using a reference frequency of 21.4 MHz and the low-pass filter. Here, the I/Q channel base-band signal has a frequency of 3.686 MHz.

Thereafter, the I-channel and Q-channel base-band analog signals are converted to 8-bit digital signals through sampling with a clock of 21.4912 MHz obtained by multiplying a base-band reference frequency with a chip rate of 3.686 MHz by 8. The 8-bit I-channel and Q-channel digital signals are transferred to the MMDA 70.

The MMDA 70 acquires synchronization in order to demodulate the received digital signals. First, the acquisition of synchronization requires determination of the position of the pseudo noise code on the transmission party such that a difference between the pseudo noise codes of the transmission and reception parties should be within a half of the chip for code recognition. After the initial synchronization, more precise synchronization is acquired through a synchronization searching function.

Information about a path having the highest energy in the 32-pseudo-chip period and variations of the channels for the path is reported to an internal control processor of the MMDA 70.

The control processor sequentially selects the positions of the paths having the highest energy based on that information and assigns them to a rake receiver.

The rake receiver performs a demodulation based on the information about the path and channels and transfers energies for the demodulated data symbols to the control processor. Thus the control processor deinterleaves the data symbol energies into 3-bit soft decision values and transmits the 3-bit soft decision values to the MUMA 40.

To perform a Viterbi function, the MUMA 40 transmits the soft decision values received from the MMDA 70 to a Viterbi decoder pool 80 via the PTM 91. That is, the MUMA 40 requests the base station controller to report the ID number of an idle Viterbi decoder, so as to discriminate which one is in the idle mode among the Viterbi decoders in the Viterbi decoder pool 80.

The MUMA 40 transmits the ID numbers of the idle base station controller and the idle Viterbi decoder received from the base station controller to the corresponding Viterbi decoder of the Viterbi decoder pool 80. Thus the corresponding Viterbi decoder performs a Viterbi decoding at bit rates of 1, ½, ⅓ and ¼ in order to determine the data bit rate and transmits the decoded values to the corresponding transceiver controller of the dedicated packet router assembly 30. The transceiver controller transmits the input data to the base station controller at which the layer 2 is located, in order to perform a three-layered protocol.

As described above, the BTS of the CDMA mobile communication system according to the present invention presents the following advantages over the prior art BTS: (1) the BTS is configured to have a separate hardware component for performing only a Viterbi decoding apart from a single hardware H/W that performs a composite function of modulation/demodulation and Viterbi encoding/decoding, thereby facilitating a decoding of demodulated signals received from multiple users; (2) the Viterbi decoders are provided in the form of a Viterbi decoder pool to enhance the modulation/demodulation efficiency relative to a hardware containing both modulator and demodulator in one hardware; (3) the BTS using a convolutional encoder and a decoder secures flexibility in alteration of the encoder, because the convolutional encoder has only to be replaced with a turbo encoder when using the turbo encoder is required; (4) the high speed packet router compensates for a delay occurring in the channel elements; and (5) the MUMA converts the user-based signals to a digital form, which allows accurate synchronization even at a high chip rate during combination of the signals.

It is to be noted that like reference numerals denote the same components in the drawings, and a detailed description of generally known function and structure of the present invention will be avoided lest it should obscure the subject matter of the present invention.

What is claimed is:

1. A base station system in a CDMA (Code Division Multiple Access) mobile communication system, which has a modulator, a demodulator and a Viterbi encoder/decoder in one hardware circuit pack, the modulator and [the] *a* Viterbi encoder being provided in one hardware by sectors;

more than one demodulator being provided by sectors for demodulating signals from multiple users; and more than one Viterbi decoder being separately provided for performing a Viterbi decoding of the signals demodulated at the [plural] *more than one* demodulator constituted in each sector *of the sectors*.

2. The base station system as claimed in claim 1, wherein the Viterbi decoders are configured in the form of a Viterbi decoder pool.

3. A base station in a CDMA mobile communication system, which has a base station, a base station controller and a control station, the base station system comprising:

a dedicated packet router section for routing a voice-encoded signal received from the control station to the base station and data decoded from the base station to the control station;

a modulating section for calculating cyclic redundancy codes of I (In-phase)/Q (Quadrature) channel data received from the dedicated packet router section and convolution-encoding and interleaving the I/Q channel data using the calculated cyclic redundancy codes, and spreading the convolution-encoded and interleaved I/Q channel data;

a first intermediate frequency processing section for converting the convolution-encoded and interleaved I/Q channel data from the modulating section to analog signals, up-converting the analog signals to intermediate frequency signals having a frequency, and transmitting the intermediate frequency signals to a radio frequency signal processing unit;

a second intermediate frequency processing section for down-converting the intermediate frequency signals having a frequency received from the radio frequency signal processing unit to I/Q channel base-band signals, and converting the I/Q channel base-band signals to digital signals;

a demodulating section for despreading and deinterleaving the I/Q channel data from the second intermediate frequency processing section, and transmitting the despread and [interleaved] *deinterleaved* I/Q channel data to the modulating section; and a decoding section for Viterbi-decoding [the] demodulated data from the demodulating section.

4. The base station system as claimed in claim 3, wherein the modulating section comprises:

a packet transceiver module for receiving traffic or signal data from the control station;

a first dual port RAM for temporarily storing [the] data received from the packet transceiver module;

a control module for reading the data stored in the first dual port RAM for [the purpose of] modulation, storing the read data in a second dual port RAM, and adequately controlling output of the data stored in the second dual port RAM;

an encoding and interleaving module for encoding and interleaving [the] data output from the second dual port RAM;

main and sub channel spreading modules for spreading the encoded and interleaved data according to main and sub channels, respectively;

a gain control module for gain-controlling [the] respective channel data output from the main and sub channel spreading module, and combining the gain-controlled data channel; and a band-pass filter module for band-pass filtering the gain-controlled data received from the gain control module, and transmitting the band-pass filtered data to a first intermediate frequency and clock distributing section.

5. The base station *system* as claimed in claim 3, wherein the demodulating section comprises a plurality of demodulators for accommodating multiple users.

6. The base station system as claimed in claim 3, wherein the decoding section comprises a plurality of Viterbi decoders in the form of a Viterbi decoder pool, for separately Viterbi decoding the [signals] *demodulated data* output from the individual demodulators of the demodulating section.

7. The base station *system* as claimed in claim 3, wherein upon receiving data from the demodulating section, the modulating section requests the base station controller to report the ID number of an idle Viterbi decoder, so as to discriminate which [one] *Viterbi decoder* is in [the] *an* idle mode among [the] plural Viterbi decoders of the decoding section, and upon receiving the ID number of the idle Viterbi decoder, transmits [input] *the* data *received* from the demodulating section to [the] *a* corresponding Viterbi decoder.

8. The base station system as claimed in claim 7, wherein the corresponding Viterbi decoder of the decoding section Viterbi decodes input data from the modulating section at bit rates of 1, ½, ⅓ and ¼.

* * * * *